United States Patent Office 3,074,935
Patented Jan. 22, 1963

3,074,935
6-EXOMETHYLENE STEROIDS AND
PROCESS THEREFOR
John Fried, Plainfield, Anthony N. Nutile, Elizabeth, and
Glen E. Arth, Cranford, N.J., assignors to Merck & Co.,
Inc., Rahway, N.J., a corporation of New Jersey
No Drawing. Filed June 13, 1960, Ser. No. 35,416
30 Claims. (Cl. 260—239.55)

This invention is concerned generally with novel steroid compounds and with processes of making the same. More particularly, it relates to novel 6-exomethylene-$\Delta^4$-steroid-3-ones and 6-exomethylene-$\Delta^{1,4}$-steroid-3-ones and to the process of making such compounds, starting with a 5α-steroid-3,6-dione.

In accordance with the present invention, we have found that the novel 6-exomethylene-$\Delta^4$-steroid-3-ones can be prepared from the 5α-steroid-3,6-diones by a process which can be represented as follows, showing the A and B rings of the steroid molecule:

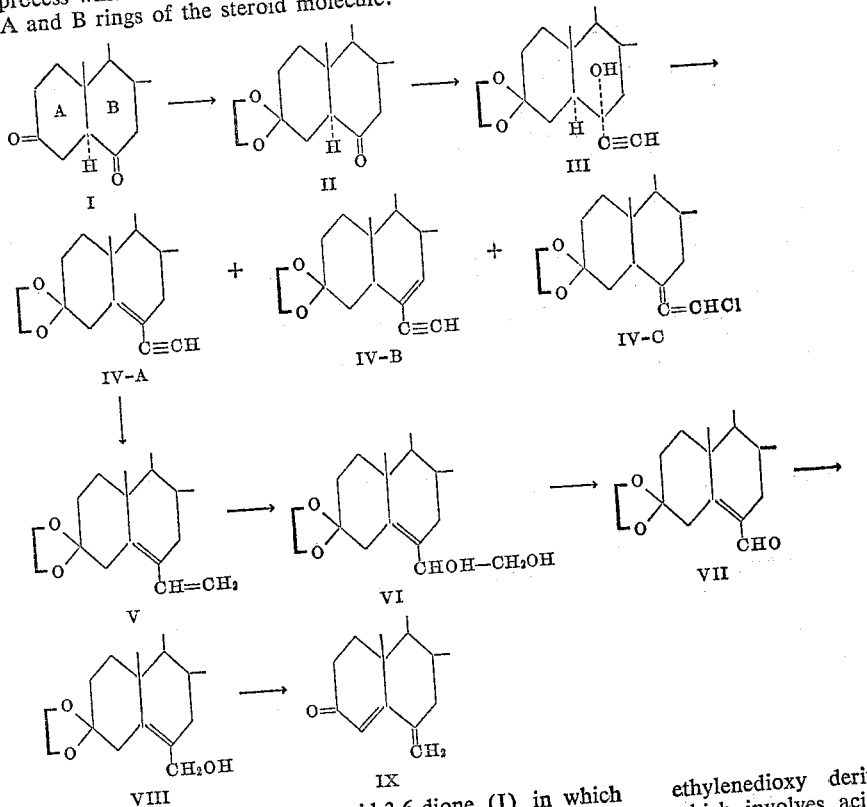

In this process the 5α-steroid-3,6-dione (I) in which any oxygen function present at C-17, or in a side chain attached at the C-17 position of the steroid molecule, is first protected with suitable protecting groups, is converted into the 3-alkylenedioxy-5α-steroid (II). The 3-alkylenedioxy- 5α-steroid (II) is then reacted with acetylene magnesium bromide to obtain the corresponding 6α-ethynyl-3-alkylenedioxy-5α-steroid-6β-ol (III). The latter compound is then dehydrated, for example, with thionyl chloride in pyridine to give the 6-ethynyl-3-alkylenedioxy-$\Delta^5$-steroid (IV-A), which may be admixed with small quantities of 6-ethynyl-3-alkylenedioxy-$\Delta^6$-steroid (IV-B) and 6-([2]-chloro-[1,2]-propadiene)-3-alkylenedioxy-steroid (IV-C) and requires separation therefrom. Upon hydrogenation of (IV-A) using a catalyst, the corresponding 6-vinyl-derivative (V) is obtained, which is then oxidized with osmium tetroxide to give the corresponding 6-diol (VI). The latter compound is then reacted with periodic acid to cleave the 6-diol and give the 6-formyl-derivative (VII). Reduction of (VII) with sodium borohydride gives the 6-hydroxymethyl derivative (VIII), which on dehydration with an acidic reagent such as p-toluenesulfonic acid forms the 6-exomethylene derivative (IX). Any protecting groups which are present at C-17, or in a side chain attached at the C-17 position of the steroid molecule, may then be removed.

In the first step of our process, the 3-keto-group of the 5α-steroid-3,6-dione (protected at C-17 as indicated above) is blocked by forming the 3-alkylenedioxy derivative. In a preferred embodiment of our invention the 3-keto group is protected by forming the 3-ethylenedioxy derivative. This derivative is prepared by reaction of a solution of the steroid in a solvent such as benzene with an equivalent amount of ethylene glycol and p-toluenesulfonic acid for 8–12 hours. The product may be recovered by washing with aqueous sodium bicarbonate, drying and concentrating in vacuo.

The 3-keto group may also be converted into the 3-ethylenedioxy derivative by exchange dioxolanation, which involves acid-catalyzed transfer of the ethylene glycol portion of simple 2,2-dialkyl-1,3-dioxolanes, such as 2,2'-dimethyl-1,3-dioxolane (acetone ethyleneketal) or, better, 2-methyl-2-ethyl-1,3-dioxolane (butanone ethylene-ketal), with the 3-ketone steroid either in an inert solvent, as benzene, or simply in excess reagent.

Other cyclic ketal derivatives can be used in our process for protecting a ketone group at C-3. In general, we have found that the lower alkylenedioxy derivatives, wherein the hydrocarbon group contains not more than seven carbon atoms, such as the ethylenedioxy, trimethylenedioxy, propylenedioxy and butylenedioxy derivatives are suitable in carrying out the processes of our invention. However, in place of using a lower alkylenedioxy substituent to block or protect the keto substituent, we can use other derivatives readily hydrolyzable to keto, such as a dialkyl ketal, an enol ether monothioketal, or a dithioketal derivative for this purpose.

The second step of our process, comprising the reaction of the 3-alkylenedioxy-5α-steroid (II) with acetylene magnesium bromide, is brought about by adding a solution of the steroid in a solvent such as tetrahydrofuran to a solution of the acetylene magnesium bromide in the same solvent, while bubbling acetylene through the mixture. For obtaining maximum yields, it is desirable to employ an excess of acetylene magnesium bromide. The reaction takes place by letting the mixture stand for 4–16 hours at room temperature or above. After completion of the reaction, the 6α-ethynyl-3-alkylenedioxy-5α-steroid-6β-ol (III) is separated by chromatographing on acid-washed alumina and elution with mixtures of chloroform and ether. The product may be purified by recrystallization.

The third step of our process is effected by dehydrating the 6α-ethynyl-3-alkylenedioxy-5α-steroid-6β-ol (III), using as the dehydrating agent thionyl chloride, or $POCl_3$, in a tertiary base such as pyridine. Other tertiary bases suitable for this purpose are the N-alkyl piperidines, collidines, and the trialkylamines. The dehydration is conveniently brought about by adding a solution of freshly distilled thionyl chloride in ice cold pyridine to a solution of the the steroid in pyridine, the rate of addition being controlled so as to maintain the temperature of the reaction mixture at 30° C. or below. After completion of the reaction, the 6-ethynyl-3-alkylenedioxy-$\Delta^5$-steroid (IV-A) is recovered by pouring the ice-cooled mixture into ice water and extracting the resulting aqueous solution with a solvent such as chloroform, benzene, ethyl acetate, methylene chloride and the like, drying the extracts and concentrating in vacuo. The product can be purified by recrystallization.

Additional quantities of the 6-ethynyl-3-alkylenedioxy-$\Delta^5$-steroid (IV-A) may be obtained from the mother liquors by chromatography over acid-washed alumina and elution with ether. Elution of the chromatograph with mixtures containing varying quantities of ether and petroleum ether may also yield the 6-ethynyl-3-alkylenedioxy-$\Delta^6$-steroid (IV-B) and the allene derivative, 6-([2]chloro-[1,2]-propadiene)-3-alkylenedioxy-steroid (IV-C). These by-products are useful intermediates in the production of steroids having valuable physiological properties.

In the fourth step of our process, the 6-ethynyl-3-alkylenedioxy-$\Delta^5$-steroid (IV-A) is hydrogenated to the corresponding 6-vinyl-derivative with the use of a catalyst, for example, the Lindlar catalyst (lead de-activated palladium on a calcium carbonate support). The 6-ethynyl-3-alkylenedioxy-$\Delta^5$-steroid (IV-A), dissolved in a suitable solvent, such as ethyl acetate, is hydrogenated at atmospheric pressure at about 23° C. To obtain maximum yields, the catalyst is added in separate portions as the hydrogenation proceeds, since the rate of hydrogenation slows down after a time, due to poisoning of the catalyst. Filtration of the spent catalyst before the addition of the final portion of the catalyst aids in carrying the hydrogenation to completion. After the completion of the reaction, the mixture is filtered and concentrated to obtain the 6-vinyl-3-alkylenedioxy-$\Delta^5$-steroid (V), which can be used without further purification in the next step of the synthesis.

In the fifth step of our reaction, the crude 6-vinyl-3-alkylenedioxy-$\Delta^5$-steroid (V) is oxidized to the 6-([1,2]-ethanediol)-3-alkylenedioxy-$\Delta^5$-steroid (VI). The oxidation is carried out preferably with the use of osmium tetroxide. This reagent gives a selective osmylation of the diene compound, reacting only with the less hindered of the two double bonds present. The reaction is carried out in a solvent such as benzene by allowing the mixture to stand at room temperature for about 8 hours. The amount of osmium tetroxide employed is approximately 60% of the theoretical amount, based on the total weight of the crude material.

The osmate is decomposed by adding the reaction mixture to an aqueous methanol solution containing inorganic salts, for example, potassium bicarbonate and sodium sulfite, distilling off the benzene, adding more methanol to the mixture and refluxing for several hours. The product is recovered by filtering the solution, and extracting with a solvent such as chloroform. The solvent layer is washed with water, dried and concentrated in vacuo to give the 6-([1,2]-ethanediol)-3-alkylenedioxy-$\Delta^5$-steroid (VI), which can be used without further purification in the next step of the synthesis.

In the sixth step of our process, the 6-diol (VI) is cleaved with periodic acid to form the 6-formyl derivative (VII). This conversion is carried out by reaction of the crude diol with an equivalent amount of periodic acid in a solution containing an aqueous mixture of pyridine and methanol at approximately room temperature for 30–60 minutes. The product is recovered by pouring the reaction mixture into an aqueous solution of sodium bicarbonate, and extracting with a solvent such as chloroform. The solvent layer is washed with water, dried and concentrated to give a crystalline material which is the 6-formyl-3-alkylenedioxy-$\Delta^5$-steroid (VII). Any contamination of the 6-ethynyl-3-alkylenedioxy-$\Delta^5$-steroid (IV-A) with the 6-ethynyl-3-alkylenedioxy-$\Delta^6$-steroid (IV-B) formed as a by-product in the third step of our process will result in the recovery of some 6-formyl-3-alkylenedioxy-$\Delta^6$-steroid in the 6th step of the process. The 6-formyl-3-alkylenedioxy-$\Delta^6$-steroid is a useful intermediate in the production of steroids having valuable physiological properties.

Reduction of the 6-formyl-derivative (VII) to the 6-hydroxymethyl-derivative (VIII) in the seventh step of our process is brought about preferably with sodium borohydride. A solution of the steroid in a solvent such as tetrahydrofuran is stirred at room temperature with a solution of sodium borohydride in water. The product is recovered by pouring into a solution of sodium dihydrogenphosphate in water, and extracting with a solvent, for example, chloroform. The solvent layer is washed with water, dried and concentrated in vacuo. Crystallization from a solvent such as benzene gives the 6-hydroxymethyl-3-alkylenedioxy-$\Delta^5$-steroid.

In the eighth step of our synthesis, dehydration of the 6-hydroxymethyl-group, together with simultaneous removal of the 3-alkylenedioxy-group, results in the conversion of the 6-hydroxymethyl-3-alkylenedioxy-$\Delta^5$-steroid (VIII) into the 6-exomethylene-$\Delta^4$-steroid-3-one (IX). This reaction is readily brought about by reaction of a solution of the 6-hydroxymethyl-steroid (VIII) with p-toluenesulfonic acid and letting the mixture stand at room temperature for several hours. The product is recovered by pouring the mixture into ice water and then extracting the resulting aqueous solution with a solvent such as chloroform or ethyl acetate.

The process of forming the 6-exomethylene derivatives of the $\Delta^4$-steroid-3-ones is not limited to any particular type of steroid compounds, but is an effective procedure for steroid compounds generally, and includes especially steroids of the androstane and pregnane series, provided that any oxygen function present at C–17, or in a side chain attached at the C–17 position of the steroid molecule, is first protected by suitable protecting groups.

If the synthesis is started with a 5α-pregnane-17α,21-diol-3,6,20-trione, in which the dihydroxyacetone side chain at the 17-carbon atom is first protected by the formation of the 17α,20,20,21-bis-methylenedioxy derivative, the removal of the bis-methylenedioxy function is accomplished with aqueous organic acids such as formic or acetic acids.

In a preferred embodiment of our invention, the 6-exomethylene-17α,20,20,21-bis-methylenedioxy-4-pregnene-3-one is heated on a steam bath for about 20 minutes with 60% aqueous formic acid to give the 6-exomethylene-4-pregnene-17α,21-diol-3,20-dione in 50 to 75% yields. The organic phase is washed with dilute alkali, dried and concentrated in vacuo to give the crystalline product. The non-crystalline material may be recovered as the corresponding 21-acetate after first cleaving any formate esters present, suitably by reaction with sodium methylate in methanol, recovering the product, and then acetylating with acetic anhydride and pyridine.

Alternately, heating the 17α,20,20,21-bis-methylenedioxy-derivative with 50% acetic acid at 100° C. for 7 hours, followed by acetylation and chromatography, gives the 6-exomethylene-4-pregnene-17α,11β,21-triol-3,-20-dione-21-acetate in 50–60% yields.

Following the procedure set forth above, 6-exomethylene-4-pregnene-11β,17α,21-triol-3,20-dione and the corresponding 21-acetate are prepared by the following steps: 17α,20,20,21-bis-methylenedioxy-3-ethylenedioxy-5α-pregnane-6,11-dione is reacted with acetylene magnesium bromide to give 6α-ethynyl-17α,20,20,21-bis-methylenedioxy - 3 - ethylenedioxy-5α-pregnane-6β-ol-11-one, which is dehydrated with thionyl chloride in pyridine at 30° C. or below to form 6-ethynyl-17α,20,20,21-bis-methylenedioxy-3-ethylenedioxy-5-pregnene-11-one and also small quantities of 6-ethynyl-17α,20,20,21-bis-methylenedioxy - 3-ethylenedioxy-6-pregnene-11-one and 6-([2]-chloro - [1,2] - propadiene)-17α,20,20,21-bis-methylenedioxy-3-ethylenedioxy-5-pregnane-11-one. The 6-ethynyl-17α,20,20,21 - bis - methylenedioxy-3-ethylenedioxy-5-pregnene-11-one is separated from 6-ethynyl-17α,20,20,-21 - bis-methylenedioxy-3-ethylenedioxy-6-pregnene-11-one and 6-([2]chloro-[1,2]-propadiene)-17α,20,20,21-bis-methylenedioxy-3-ethylenedioxy-pregnane-11-one by chromatography on acid-washed alumina, and purified by recrystallization from ethyl acetate. The 6-ethynyl-17α,20,20,21 - bis - methylenedioxy-3-ethylenedioxy-5-pregnene-11-one dissolved in ethyl acetate, at atmospheric pressure at about 20–25° C., to give 6-vinyl-17α,20,20,21-bis - methylenedioxy-3-ethylenedioxy-5-pregnene-11-one. The latter compound is oxidized with osmium tetroxide to give 6-([1,2]-ethanediol)-17α,20,20,21-bis-methylenedioxy-3-ethylenedioxy-5-pregnene-11-one, which is then cleaved with periodic acid to yield 6-formyl-17α,20,20,21-bis-methylenedioxy-3-ethylenedioxy-5-pregnene-6-formyl-17α,20,20,21-bis-methylenedioxy-3-ethylenedioxy-3-ethyl- The 6-formyl-17α,20,20,21-bis-methylenedioxy-3-ethylenedioxy-5-pregnene-11-one is converted into the 6-hydroxymethyl-17α,20,20,21-bis-methylenedioxy-3-ethylenedioxy-5-pregnene-11β-ol, by contacting with sodium borohydride for about 60 hours at room temperature. The 6 - hydroxymethyl - 17α,20,20,21-bis-methylenedioxy-3-ethylenedioxy-5-pregnene-11β-ol is converted into 6-exomethylene - 17α,20,20,21-bis-methylenedioxy-4-pregnene-11β-ol-3-one by reaction with p-toluenesulfonic acid at room temperature for several hours. The 6-exomethylene - 17α,20,20,21-bis-methylenedioxy-4-pregnene-11β-ol-3-one is transformed into 6-exomethylene-4-pregnene-11β,17α,21-triol-3,20-dione by heating with 60% formic acid on a steam bath. The crystalline material is the 6-exomethylene - 4 - pregnene-11β,17α,21-triol-3,20-dione. The non-crystalline material is recovered as the 6-exomethylene-4-pregnene-11β,17α,21-triol-3,20-dione 21-acetate by reaction with sodium methoxide in methanol to cleave any formate esters, recovering the product, and acetylating with acetic anhydride in pyridine.

The 6-exomethylene-4-pregnene-17α,21-diol-3,11,20-trione and the corresponding 21-acetate are prepared by converting the 17α,20,20,21-bis-methylenedioxy-3-ethylenedioxy-5α-pregnane-6,11-dione into the 6-formyl-17α,-20,20,21 - bis-methylenedioxy-3-ethylenedioxy-5-pregnene-11-one as indicated above. The latter compound is then converted into the 6-hydroxymethyl-17α,20,20,21-bis-methylenedioxy - 3-ethylenedioxy-5-pregnene-11-one by contacting with sodium borohydride for about 50 minutes at room temperature. The 6-hydroxymethyl-17α,20,20,-21 - bis-methylenedioxy-3-ethylenedioxy-5-pregnene-11-ol is converted into 6-exomethylene-17α,20,20,21-bis-methylenedioxy-4-pregnene-3,11-dione by reaction with p-toluene-sulfonic acid at room temperature for several hours. The 6-exomethylene-17α,20,20,21-bis-methylenedioxy-4-pregnene-3,11-dione is transformed into 6-exomethylene-4-pregnene-17α,21-diol-3,11,20-trione by heating with 60% formic acid on a steam bath. The crystalline material is the 6-exomethylene-4-pregnene-17α,21-diol-3,11,-20-trione. The non-crystalline material is recovered as the 6 - exomethylene-4-pregnene-17α,21-diol-3,11,20-trione-21-acetate by reaction with sodium methoxide in methanol to cleave any formate esters, recovering the product, and acetylating with acetic anhydride in pyridine.

Following the procedure set forth above, 16α-methyl-6-exomethylene-4-pregnene-11β,17α,21-triol-3,20-dione and the corresponding 21-acetate are prepared by the following steps: 16α - methyl-17α-20,20,21-bis-methylenedioxy-3-ethylenedioxy-5α-pregnane-6,11-dione is reacted with acetylene magnesium bromide to give 16α-methyl-6α-ethynyl-17α,20,20,21-bis-methylenedioxy - 3 - ethylenedioxy-5α-pregnane-6β-ol-11-one, which is dehydrated with thionyl chloride in pyridine at 30° C. or below to form 16α-methyl-6-ethynyl - 17α,20,20,21 - bis-methylenedioxy-3-ethylenedioxy-5-pregnene-11-one and also small quantities of 16α-methyl-6-ethynyl-17α,20,20,21-bis-methylenedioxy-3-ethylenedioxy-6-pregnene-11-one and 16α-methyl-6-([2]-chloro-[1,2]-propadiene) - 17α,20,20,21-bis-methylenedioxy-3-ethylenedioxy-5-pregnane-11-one. The 16α-methyl-6-ethynyl-17α,20,20,21 - bis - methylenedioxy - 3-ethylenedioxy-5-pregnene-11-one is separated from the by-products by chromatography on acid-washed alumina, and purified by recrystallization from ethyl acetate. The 16α - methyl - 6 - ethynyl-17α,20,20,21-bis-methylenedioxy-3-ethylenedioxy-5-pregnene-11-one, dissolved in ethyl acetate, is then hydrogenated, using a Lindlar catalyst, at atmospheric pressure at about 20–25° C., to give 16α-methyl-6-vinyl - 17α,20,20,21 - bis - methylenedioxy-3-ethylenedioxy-5-pregnene-11-one. The latter compound is oxidized with osmium tetroxide to give 16α-methyl-6-([1,2]-ethanediol)-17α,20,20,21 - bis - methylenedioxy-3-ethylenedioxy-5-pregnene-11-one, which is then cleaved with periodic acid to yield 16α-methyl-6-formyl-17α,20,-20,21-bis-methylenedioxy - 3 - ethylenedioxy-5-pregnene-11-one.

The 16α - methyl-6-formyl - 17α,20,20,21 - bis-methylenedioxy-3-ethylenedioxy-5-pregnene-11-one is converted into the 16α-methyl-6-hydroxymethyl-17α,20,20,21-bis-methylenedioxy - 3 - ethylenedioxy-5-pregnene-11β-ol, by contacting with sodium borohydride at room temperature for about 50 minutes. The 16α-methyl-6-hydroxymethyl-17α,20,20,21 - bis - methylenedioxy-3 - ethylenedioxy-5-pregnene-11β-ol is transformed into 16α-methyl-6-exomethylene - 17α,20,20,21- - bis - methylenedioxy-4-pregnene-11β-ol-3-one by reaction with p-toluenesulfonic acid at room temperature for several hours. The 16α-methyl-6-exomethylene-17α,20,20,21 - bis - methylenedioxy - 4-pregnene-11β-ol-3-one is converted into 16α-methyl-6-exomethylene-4-pregnene-11β,17α,21-triol-3,20-dione by heating with 60% formic acid on a steam bath. The crystalline material is the 16α-methyl-6-exomethylene-4-pregnene-11β,17α,21-triol - 3,20 - dione. The non-crystalline material is recovered as the 16α-methyl-6-exomethylene-4-pregnene-11β,17α,21-triol-3,20-dione-21-acetate by reaction first with sodium methoxide in methanol to cleave any formate esters, recovering the product, and acetylating with acetic anhydride in pyridine.

The 16α - methyl - 6 - exomethylene - 4 - pregnene-17α,21-diol-3,11,20 trione and the corresponding 21-acetate are prepared by converting the 17α,20,20,21-bis-methylenedioxy - 3 - ethylenedioxy - 17α,20,20,21 - bis - methylenedioxy-16α - methyl-6-formyl - 17α,20,20,21 - bis - methylenedioxy-3-ethylenedioxy-5-pregnene-11-one as indicated above. The latter compound is then converted into the 16α-methyl - 17α,20,20,21 - bis - methylenedioxy-yl-6-hydroxymethyl - 17α,20,20,21 - bis - methylenedioxy-3-ethylenedioxy-5-pregnene-11-one by contacting with sodium borohydride for about 50 minutes at room temperature. The 16α - methyl-6-hydroxymethyl - 17α,20,20,21-bis-methylenedioxy - 3 - ethylenedioxy - 5 - pregnene-11-ol is converted into 16α-methyl-6-exomethylene-17α,20,20, 21-bis-methylenedioxy - 4 - pregnene - 3,11-dione by reaction with p-toluenesulfonic acid at room temperature for several hours. The 16α-methyl-6-exomethylene-17α,20, 20,21-bis-methylenedioxy-4-pregnene-3,11-dione is transformed into the 16α-methyl-6-exomethylene-4-pregnene-17α,21-diol-3,11,20-trione by heating with 60% formic acid on a steam bath. The crystalline material is the 16α-methyl-6-exomethylene - 4 - pregnene - 17α,21-diol-3,11, 20-trione. The non-crystalline material is recovered as the 16α-methyl-6-exomethylene - 4 - pregnene - 17α,21-diol-3,11,20-trione 21-acetate by reaction with sodium methoxide in methanol to cleave any formate esters, recovering the product, and acetylating with acetic anhydride in pyridine.

The 16α-methyl - 17α,20,20,21 - bis - methylenedioxy-5α-pregnane-6,11-dione used as the starting material for the above reaction can be prepared by reacting 16α-methyl-cortisone with formalin and concentrated HCl to give 16α-methyl - 17α,20,20,21 - bis - methylenedioxy - 4-pregnene-3,11-dione. The latter compound is converted into 16α-methyl - 17α,20,20,21 - bis - methylenedioxy-3-ethylenedioxy-5-pregnene-11-one on reaction with ethylene glycol and p-toluenesulfonic acid. The 16α-methyl-17α, 20,20,21-bis - methylenedioxy - 3 - ethylenedioxy-5-pregnene-11-one is oxidized with perbenzoic acid to give a mixture of the 16α-methyl-17α,20,20,21-bis-methylenedioxy-3-ethylenedioxy-5α-pregnane-11-one-5,6 oxides, which on reaction sequentially with formic acid and then with potassium hydroxide solution gives 16α-methyl-17α,20,20,21-bis-methylenedioxy-5α-pregnane-3,6,11-trione. The latter compound is reacted with butanone dioxolane to give 16α-methyl - 17α,20,20,21 - bis - methylenedioxy - 5α - pregnane-6,11-dione.

The novel 6-exomethylene-4-pregnene-11β,17α,21-triol-3,20-dione, the 16α-methyl-6-exomethylene-4-pregnene-11β,17α,21-triol-3,20-dione, and the 21-acetates thereof, may be dehydrogenated at C-1 to form the corresponding 1,4-pregnadienes by the use of selenium dioxide, or by microbiological methods.

The novel 6-exomethylene Δ⁴-pregnene-3-ones and the 6-exomethylene-Δ¹,⁴-pregnadiene-3-ones possess high anti-inflammatory activity, and are especially effective for the treatment of arthritis and related diseases, since they can be administered for their cortisone-like action in low dosage, thereby minimizing undesirable side effects.

A further embodiment of our invention comprises novel pharmaceutical compositions containing these 6-exomethylene-Δ⁴-steroid-3-ones and 6-exomethylene-Δ¹,⁴-steroid-3-ones.

The following examples illustrate methods of carrying out the present invention but it is to be understood that these examples are given for purposes of illustration and not of limitation:

*Example 1*

A solution of ethyl magnesium bromide is prepared from 20 g. of magnesium and 80 cc. of ethyl bromide in 200 cc. of anhydrous tetrahydrofuran. Acetylene is bubbled through a solution of tetrahydrofuran for about 1 hour to form a saturated solution. The ethyl magnesium bromide is then added at a temperature of 40-50° C. over a period of 0.5 hour to the saturated solution of acetylene in tetrahydrofuran, and the mixture is kept at room temperature for an additional 2 hours, during which time the acetylene flow is continued. A solution of 18 g. of 17α,20,20,21-bis-methylenedioxy-3-ethylenedioxy-5α-pregnane-6,11-dione in 200 cc. of tetrahydrofuran is then added to the acetylene magnesium bromide for a period of 0.3 hour and the resulting solution is kept at room temperature over night, the acetylene flow being discontinued 3.2 hours after the addition of the steroid (7 hours total from the start). The reaction mixture is then poured into 2 liters of water and extracted with ethyl acetate. The organic phase is washed with water, dried over sodium sulfate and concentrated in vacuo. The crude product is chromatographed on acid-washed alumina. Elution with mixtures of chloroform and ether, and crystallization from ethyl acetate yields 17.2 g. (90%) of 6α-ethynyl-17α,20,20,21-bis-methylenedioxy - 3 - ethylenedioxy-5α-pregnane-6β-ol-11-one, M.P. 221-230° C. A sample for analysis, after recrystallization from ethyl acetate, has the following properties: M.P. 223-229° C.; $\alpha_D^{24}$ —62° (c. 1.0 CHCl₃). Analysis (calculated for C₂₇H₃₆O₈): C, 66.37; H, 7.43. Found (approximately): C, 66.87; H, 7.29.

*Example 2*

A solution of thionyl chloride in pyridine is prepared by adding 7.3 cc. of freshly distilled thionyl chloride to 36 cc. of ice cold anhydrous pyridine. This is added dropwise to a stirred solution of 6α-ethynyl-17α,20,20,21-bis-methylenedioxy - 3 - ethylenedioxy - 5α - pregnane - 6β-ol-11-one in 42 cc. of pyridine. The rate of addition is controlled so to maintain the temperature of the reaction mixture at 30° C. or below. The solution is stirred an additional 0.5 hour, cooled in ice and poured into ice water. The mixture is extracted with chloroform, washed with water, dried and concentrated in vacuo. Crystallization from ether affords 2.64 g. of 6-ethynyl-17α,20,20,21-bis - methylenedioxy - 3 - ethylenedioxy - 5 - pregnene-11-one which decomposes at 200–207° C. The sample for analysis, recrystallized from ether, has the following properties: decomposes at 208° C., $\alpha_D^{23}$ —103° (c. 0.85 CHCl₃); U.V. λ max. 233 mμ, ε=12,500. Calculated for C₂₇H₃₄O₇: C, 68.92; H, 7.28. Found: C, 68.71; H, 7.09.

The mother liquors are chromatographed on acid-washed alumina. Elution with a 5:5 mixture of ether and petroleum ether affords 331 mg. of 6-([2]chloro-[1,2]-propadiene) - 17α,20,20,21 - bis - methylenedioxy-3-ethylenedioxy-5-pregnane-11-one, M.P. 176–210° C. Two crystallizations from methanol affords an analytical sample, which has the following properties: decomposes at 239–248° C.; $\alpha_D^{22}$ —157° (c. 0.5 CHCl₃). Calculated for C₂₇H₃₅O₇Cl: C, 63.96; H, 6.96; Cl, 7.02. Found: C, 63.67; H, 7.11; Cl, 7.06.

Further elution with mixtures of ether and petroluem ether gives a product which shows ultraviolet absorption at 224 mμ. This is considered to be the 6-ethynyl-17α, 20,20,21 - bis - methylenedioxy - 3 - ethylenedioxy - 6-pregnene-11-one.

Elution with ether affords an additional 0.87 g. of 6-ethynyl - 17α,20,20,21 - bis - methylenedioxy-3-ethylenedioxy-5-pregnene-11-one decomposing at 194–204° C., a total of 3.51 g. (56%).

*Example 3*

A solution of 3.70 g. of 6-ethynyl-17α,20,20,21-bis-methylenedioxy-3-ethylenedioxy-5-pregnene-11-one in 125 cc. of 23° C. using 3.15 g. of Lindlar catalyst, which is added in 3 separate 1.05 g. portions: (1) at the beginning of the hydrogenation, (2) after about 20 minutes, and (3) after about 40 minutes, after first filtering off the spent catalyst. A total of about 177 cc. of hydrogen is absorbed, the calculated amount being 189 cc. The solution is filtered and concentrated. The crude diene, 6-vinyl-17α,20,20,21-bis-methylenedioxy - 3 - ethylenedioxy-5-pregnene-11-one showed the following properties: U.V. max. 238 mu, 11,600; 242 mμ, ε 11,600. The unpurified material may be used directly in the next step, or it may be purified by chromatography on alumina followed by recrystallization.

*Example 4*

A solution consisting of 3.8 g. of the crude 6-vinyl-17α,20,20,21 - bis - methylenedioxy - 3 - ethylenedioxy-5-pregnene-11-one and 1.23 g. of OsO₄ (60% of the amount calculated for the pure steroid) in 100 cc. of benzene is allowed to stand at room temperature overnight. The black osmate is transferred to a flask containing 150 cc. each of water and methanol, and 15 g. each of potassium bicarbonate and sodium sulfite. The benzene is removed by distillation, 200 cc. of methanol is added, and reflux is continued for a total of 4.5 hours. The solution is filtered and extracted with chloroform. The chloroform layer is washed with water dried and concentrated in vacuo to give the 6-([1,2]-ethanediol)-17α,20,20,21-bis-methylenedioxy - 3 - ethylenedioxy - 5 - pregnene - 6β-ol-11-one. The unpurified material may be used directly in the next step, or it may be purified by chromatography on alumina.

*Example 5*

The 6-([1,2] - ethanediol)-17α,20,20,21-bis-methylenedioxy-3-ethylenedioxy-5-pregnene-11-one is cleaved by reaction of 3.9 g. of the crude diol with 3.8 g. of periodic acid in a solution consisting of 99 cc. methanol, 90 cc. pyridine and 90 cc. of water. The solution is maintained at room temperature for 45 minutes (there is an initial temperature rise) and poured into aqueous sodium bicarbonate. The mixture is extracted with chloroform and the chloroform layer is washed with water, dried and concentrated. Trituration with ether affords 2.2 g. of crude crystalline material, M.P. 200–210° C. Crystallization from ethyl acetate affords 0.80 g. (22%) of 6-formyl - 17α,20,20,21 - bis - methylenedioxy-3-ethylenedioxy-5-pregnene-11-one, which has the following properties: M.P. 235–245° C.; $\alpha_D^{25}$ —164° (c. 0.8 $CHCl_3$);

U.V. $\lambda_{max.}^{MeOH}$ 252 mμ, ε 11,600

Calculated for $C_{26}H_{34}O_8$: C, 65.80; H, 7.22. Found: C, 65.74; H, 7.06.

Crystallization of the mother liquors gives 60 mg. of 6 - formyl - 17α,20,20,21 - bis - methylenedioxy - 3 - ethylene-dioxy-6-pregnene-11-one which decomposes at 280–310° C. The formation of this compound is presumably due to the presence of some 6-ethynyl-17α,20,20,21 - bis - methylenedioxy - 3 - ethylenedioxy - 6 - pregnene-11-one as a contaminant of the 6-ethynyl-17α,20,20,21 - bis - methylenedioxy - 3 - ethylenedioxy - 5 - pregnene-11-one of Example 2. A sample for analysis, after recrystallization from ethyl acetate, has the following properties: decomposes at 350° C. $\alpha_D^{22}$ +10° (c. 0.5 dioxane);

U.V. $\lambda_{max.}^{MeOH}$ 232 mμ, ε 11,300

Analysis (calculated for $C_{26}H_{34}O_8$): C, 65.80; H, 7.22. Found (approximately): C, 66.19; H, 6.77.

*Example 6*

A solution of 0.94 g. of 6-formyl-17α,20,20,21-bis-methylenedioxy-3-ethylenedioxy-5-pregnene-11-one in 50 cc. of tetrahydrofuran is treated with a solution of 1.0 g. sodium borohydride in 10 cc. of water. The two-phase system is stirred for 64 hours at room temperature and then poured into 6.0 g. of sodium dihydrogen phosphate in 100 cc. of water. The suspension is extracted with chloroform and the organic phase is washed with water, dried and concentrated in vacuo. Crystallization from benzene affords 0.56 g. (60% yield) of 6-hydroxymethyl - 17α,20,20,21 - bis - methylenedioxy - 3 - ethylenedioxy-5-pregnene-11β-ol, M.P. 220–230° C. The sample for analysis after crystallization twice from benzene has the following properties: M.P. 221–230°; $\alpha_D^{24}$ —107° (c. 1 $CHCl_3$). Calculated for $C_{26}H_{38}O_8$: C, 65.25; H, 8.00. Found: C, 65.00; H, 8.22.

A solution of 135 mg. of 6-hydroxymethyl-17α,20,20,21 - bis - methylenedioxy - 3 - ethylenedioxy - 5 - pregnene-11β-ol and 15 mg. of p-toluenesulfonic acid in 15 cc. of acetone is allowed to stand at room temperature over night. The solution is poured into ice water and extracted with chloroform. The chloroform solution is washed with aqueous sodium bicarbonate, dried and concentrated. Crystallization from ethyl acetate gives 95 mg. 79% yield) of 6 - exomethylene-17α,20,20,21-bis-methylenedioxy - 4 - pregnene - 11β - ol-3-one, M.P. 221–228° C. The sample for analysis is crystallized twice from ethyl acetate and has the following properties: 232° C.; $\alpha_D^{22}$ +139° (c. 1 $CHCl_3$); U.V. λ max. 262 mμ, ε 9,900. Analysis (calculated for $C_{24}H_{32}O_6$): C, 69.21; H, 7.74. Found: C, 69.83; H, 7.94.

*Example 7*

A suspension of 550 mg. of 6-formyl-17α,20,20,21-bis-methylenedioxy-3-ethylenedioxy-5-pregnene-11-one, and 550 mg. of sodium borohydride in 27 ml. of tetrahydrofuran and 5.4 ml. of water is stirred for 50 minutes at room temperature. The reaction mixture is poured into ice water containing 6 g. of sodium dihydrogen phosphate, extracted with chloroform, dried and concentrated. Two crystallizations from ethyl acetate affords a sample for analysis of 6 - hydroxymethyl-17α,20,20,21-bis-methylenedioxy - 3 - ethylenedioxy - 5 - pregnene-11-one, M.P. 195–199° C.; $\alpha_D^{23}$ —69 (c. 1 $CHCl_3$). Calculated for $C_{26}H_{36}O_8$: C, 65.53; H, 7.61. Found: C, 66.01; H, 7.64.

A solution of 125 mg. of 6-hydroxymethyl-17α-20,20, 21 - bis - methylenedioxy - 3 - ethylenedioxy - 5 - pregnene-11-one, and 15 mg. of p-toluenesulfonic acid is allowed to stand at room temperature overnight. The reaction mixture is poured into aqueous sodium bicarbonate solution, extracted with chloroform, dried and concentrated. Two crystallizations from ethyl acetate-ether afford a sample of 6 - exomethylene - 17α,20,20,21 - bis-methylenedioxy-4-pregnene-3,11-dione, M.P. 197–201° C.; $\alpha_D^{24}$ +201° (c. 0.9 $CHCl_3$). Calculated for $C_{24}H_{30}O_6$: C, 69.54; H, 7.30. Found: C, 69.83; H, 7.08.

*Example 8*

A suspension of 0.26 g. of 6-exomethylene-17α,20,20, 21 - bis - methylenedioxy-4-pregnene-11β-ol-3-one in 8 cc. 60% aqueous formic acid is heated on the steam bath for 20 minutes. The resulting solution is cooled, poured into ice water and extracted with chloroform. The organic phase is washed with aqueous sodium bicarbonate, dried, and concentrated in vacuo. Crystallization from ethyl acetate affords 30 mg. of 6-exomethylene-4-pregnene-11β,17α,21-triol-3,20-dione, which has the following properties: M.P. 203° C.; $\alpha_D^{23}$ +256° (0.5 dioxane);

U.V. $\lambda_{max.}^{MeOH}$ 262 mμ, ε 10,300

To 175 mg. of the non-crystalline material is added 2 ml. of methanol and 0.10 ml. of 1 N sodium methoxide. The mixture is allowed to stand at room temperature for 15 minutes under an atmosphere of nitrogen in order to cleave any formate esters. After the addition of 2 drops of acetic acid, the material is poured into water and extracted with chloroform. The chloroform phase is washed with water, dried and concentrated in vacuo. The resulting gum is acetylated with 2.1 cc. of pyridine and 2.0 cc. acetic anhydride at room temperature overnight. The solution is poured into ice water and extracted with chloroform. The chloroform phase is dried and concentrated in vacuo. Chromatography on 10 g. of acid-washed alumina, elution with mixtures of chloroform and ether and crystallization from ethyl acetate gives 42 mg. of 6-exomethylene-4-pregnene-11β,17α,21-triol-3,20-dione-21-acetate. The analytical sample, after crystallization from ethyl acetate, has the following properties: M.P. 199–204°; $\alpha_D^{24}$ +293° (c. 0.8 $CHCl_3$;

U.V. $\lambda_{max.}^{MeOH}$ 262 mμ, ε 11,400

Calculated for $C_{24}H_{32}O_6$: C, 69.21; H, 7.74. Found: C, 69.00; H, 7.63.

The 6 - exomethylene-4-pregnene-17α,21-diol-3,11,20-trione and the corresponding 21-acetate are prepared from the 6-exomethylene-17α,20,20,21-bis-methylene-dioxy-4-pregnene-3,11-dione following the above procedures, but starting with the 6 - exomethylene - 17α,20,20, 21-bis-methylenedioxy-4-pregnene-3,11-dione in place of the 6-exomethylene-17α,20,20,21-bis-methylenedioxy-4-pregnene-11β-ol-3-one.

*Example 9*

To 100 mg. of 6-exomethylene-4-pregnene-11β,17α,21-triol-3,20-dione-21-acetate in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 6-exomethylene - 1,4 - pregnadiene - 11β,17α,21 - triol - 3,20 - dione-21-acetate.

The 6 - exomethylene-1,4-pregnadiene-17α,21-diol-3,11,20-trione-21-acetate is prepared from the 6-exomethylene-4-pregnene - 17α,21-diol-3,11,20-trione 21-acetate following the above procedure but starting with the 6-exomethylene-4-pregnene-17α,21-diol-3,11,20-trione 21-acetate in place of the 6-exomethylene-4-pregnene-11β,17α,21-triol-3,20-dione 21-acetate.

*Example 10*

*Septomyxa affinis* (ATCC 6737) is inoculated from a slant into one or more 250 ml. shake flasks containing 50 ml. of the following medium: 2% Edamin (Sheffield Farms), 5% glucose, and 0.5% corn steep liquor. After a 48 hour incubation at 28° C., 10 mg. of 6-exomethylene-4-pregnene-11β,17α,21-triol-3,20-dione is added to each shake flask as a dimethylformamide solution (100 mg./ml.). After a conversion period of 24 hours, the cells are removed by filtration, followed by three successive extractions with an equal volume of ethyl acetate. The extracts are combined and concentrated in vacuo. The 6-exomethylene-1,4-pregnadiene-11β,17α,21-triol-3,20-dione is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

*Bacillus sphaericus* (ATCC 12488) is inoculated from a slant into one or more 250 ml. shake flasks containing 50 ml. of the following medium: 2% Edamin (Sheffield Farms), 5% glucose, and 0.5% corn steep liquor. After a 24 hour incubation at 28° C., 10 mg. of 6-exomethylene-4-pregnene-11β,17α,21-triol-3,20-dione is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6-exomethylene-1,4-pregnadiene-11β,17α,21-triol-3,20-dione is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

The 6-exomethylene-1,4-pregnadiene-17α,21-diol-3,11,20-trione is prepared from the 6-exomethylene-4-pregnene-17α,21-diol-3,11,20-trione following the above procedures, but starting with the 6-exomethylene-4-pregnene-17α,21-diol-3,11,20-trione in place of the 6-exomethylene-4-pregnene-11β,17α,21-triol-3,20-dione.

*Corynebacterium simplex* (ATCC 6946) is inoculated from a slant to one or more 250 ml. shake flasks containing a medium having the composition: 1 g./liter yeast extract (Difco). After an 18 hour growth phase at 28° C., 10 mg. of 6-exomethylene-4-pregnene-11β,17α,21-triol-3,20-dione-21-acetate is added to each flask as a dimethylformamide solution (100 mg./ml.). After a 24 hour transformation period at 28° C., the cells are centrifuged, followed by three ethyl acetate extracts of the cell-free broth. The extracts are combined and concentrated in vacuo. The 6-exomethylene-1,4-pregnadiene-11β,17α,21-triol-3,20-dione-21-acetate is crystallized directly from the concentrate. Paper chromatography of the product in a system utilizing formamide as the stationary phase and chloroform-benzene (1:1) as the mobile phase indicates that the product possesses a polarity slightly greater than the substrate.

The 6-exomethylene-1,4-pregnadiene-17α,21-diol-3,11,20-trione 21-acetate is prepared from the 6-exomethylene-4-pregnene-17α,21-diol-3,11,20-trione-21-acetate following the above procedure, but starting with the 6-exomethylene-4-pregnene-17α,21-diol-3,11,20-trione 21-acetate in place of the 6-exomethylene-4-pregnene-11β,17α,21-triol-3,20-dione 21-acetate.

*Example 11*

To a solution of 132 g. of 16α-methyl-cortisone in 5 litres of chloroform is added 1300 ml. of concentrated hydrochloric acid and 1300 ml. of 37% formalin. The resulting system is stirred for 76 hours at room temperature. The aqueous layer is separated and discarded. The chloroform layer is washed with aqueous sodium bicarbonate until neutral, dried over sodium sulfate and concentrated in vacuo. A slurry of the residue in hot methanol affords crude crystalline 16α-methyl-17α,20,20,21-bis-methylenedioxy-4-pregnene-3,11-dione. The latter compound is separated by filtration, washed once with methanol and recrystallized from the minimum amount of methylene chloride by addition of methanol. The yield of 16α-methyl-17α,20,20,21-bis-methylenedioxy-4-pregnene-3,11-dione, is 60–70%. It has the following properties: M.P. 244–250° C., $\lambda_{max.}^{MeOH}$ 2383 (15,200)

(Found: C, 69.29; H, 7.70. Calculated for $C_{24}H_{32}O_6$: C, 69.21; H, 7.74%), $[\alpha]_D$ +75° (in $CHCl_3$).

A solution containing 16.2 g. of 16α-methyl-17α,20,20,21-bis-methylenedioxy-4-pregnene-3,11-dione dissolved in 800 cc. of benzene is refluxed over night with 40 cc. of ethylene glycol and 1.6 g. of p-toluene-sulfonic acid. The cooled solution is washed with aqueous sodium bicarbonate solution, dried over sodium sulfate and concentrated in vacuo. The crude product is adsorbed on 400 g. of acid-washed alumina from benzene. Elution with 1:1 ether-petroleum ether yields 8.5 g. (47%) of product, M.P. 200–210° C. The analytical sample of 16α - methyl-17α,20,20,21-bis-methylenedioxy-3-ethylenedioxy-5-pregnene-11-one is crystallized from methanol. It has the following properties: M.P. 211–220° C. (Found: C, 67.99; H, 8.07. Calculated for $C_{26}H_{36}O_7$: C, 67.80; H, 7.88%), $[\alpha]_D$ −80° (in $CHCl_3$).

A solution containing 16.5 g. of 16α-methyl-17α,20,20, 21 - bis-methylenedioxy - 3-ethylenedioxy-5-pregnene-11-one and 45 meq. of perbenzoic acid in a total volume of 350 ml. of benzene is stored in the dark room at 25° C. for 45 hours. The solution is decanted from some crystalline product, washed with saturated aqueous sodium bicarbonate solution and dried over sodium sulfate. Concentration in vacuo yields an additional quantity of the mixed oxides. Chromatography on fluorosil, using 5% acetone in hexane, separates the isomers. The 16α-methyl - 17α,20,20,21 - bis-methylenedioxy-3-ethylenedioxy-5,6α-oxido - 5α - pregnane-11-one has the following properties: M.P. 236–243° C. Found: C, 65.27; H, 7.45. Caculated for $C_{26}H_{36}O_8$: C, 65.57; H, 7.61), $[\alpha]_D$ −95° (in $CHCl_3$).

The mixed oxides, 16α-methyl-17α,20,20,21-bis-methylenedioxy - 3 - ethylenedioxy - 5,6α - oxide - 5α - pregnane-11-one and 16α-methyl-17α,20,20-21-bis-methylenedioxy - 3 - ethylenedioxy - 5,6β - oxide - pregnane - 11-one, are dissolved in 300 cc. of 98–100% formic acid at room temperature and allowed to stand 2.5 hours. The solution is poured into water and extracted with chloroform. The chloroform solution is washed with saturated aqueous sodium bicarbonate solution, dried over sodium sulfate and concentrated in vacuo.

The crude mixed formates dissolved in 1400 cc. of methanol are refluxed 0.5 hour under nitrogen with a solution consisting of 27 g. of potassium hydroxide and 135 cc. of water. The cooled solution is neutralized with 37 cc. of acetic acid and concentrated in vacuo at 30° C. The resulting solution is poured into water and extracted with chloroform. The chloroform layer is washed with aqueous sodium bicarbonate solution, dried over sodium sulfate and concentrated in vacuo. Crystallization from methanol yields the 16α-methyl-17α,20,20,21-bis-methylenedioxy-5α-pregnane-3,6,11-trione.

A solution consisting of 125 mg. of p-toluene-sulfonic acid in 2 cc. of butanone dioxolane is added to a boiling suspension containing 4.94 g. of the 16α-methyl-17α-20,20, 21-bis-methylenedioxy-5α-pregnane-3,6,11-trione in 115 cc. of butanone dioxolane. After a reflux period of 20 minutes, the reaction mixture is cooled quickly in an ice-bath, washed with aqueous sodium bicarbonate solution, dried over sodium sulfate and concentrated in vacuo. The material is purified by chromatography to yield the 16α-methyl - 17α,20,20,21 - bis - methylenedioxy - 3 - ethylenedioxy-5α-pregnane-6,11-dione.

Example 12

A solution of ethyl magnesium bromide is prepared from 20 g. of magnesium and 80 cc. of ethyl bromide in 200 cc. of anhydrous tetrahydrofuran. Acetylene is bubbled through a solution of tetrahydrofuran for about 1 hour to form a saturated solution. The ethyl magnesium bromide is then added at a temperature of 40–50° C. over a period of 0.5 hour to the saturated solution of acetylene in tetrahydrofuran, and the mixture is kept at room temperature for an additional 2 hours, during which time the acetylene flow is continued. A solution of 18 g. of 16α-methyl-17α,20,20,21-bis-methylenedioxy-3-ethylenedioxy-5α-pregnane-6,11-dione in 200 cc. of tetrahydrofuran is then added to the acetylene magnesium bromide for a period of 0.3 hour and the resulting solution is kept at room temperature over night, the acetylene flow being discontinued 3.2 hours after the addition of the steroid (7 hours total from the start). The reaction mixture is then poured into 2 liters of water and extracted with ethyl acetate. The organic phase is washed with water, dried over sodium sulfate and concentrated in vacuo. The crude product is chromatographed on acid-washed alumina. Elution with mixtures of chloroform and ether, and crystallization from ethyl acetate, yields 16α-methyl-6α-ethynyl-17α,20,20,21-bis-methylenedioxy-3-ethylenedioxy-5α-pregnane-6β-ol-11-one.

Example 13

A solution of thionyl chloride in pyridine is prepared by adding 7.3 cc. of freshly distilled thionyl chloride to 36 cc. of ice cold anhydrous pyridine. This is added dropwise to a stirred solution of 16α-methyl-17α-20,20, 21 - bis - methylenedioxy - 3 - ethylenedioxy - 5α - pregnane-6β-ol-11-one in 42 cc. of pyridine. The rate of addition is controlled so to maintain the temperature of the reaction mixture at 30° C. or below. The solution is stirred an additional 0.5 hour, cooled in ice and poured into ice water. The mixture is extracted with chloroform, washed with water, dried and concentrated in vacuo. Crystallization from ether affords 6α-methyl-6-ethynyl-17α,20,20,21 - bis - methylenedioxy - 3 - ethylenedioxy-5-pregnene-11-one.

The mother liquors are chromatographed on acid-washed alumina and eluted with mixtures of ether:petroleum ether to give 16α-methyl-6-([2]-chloro-[1,2]-propadiene)-17α,20,20,21 - bis - methylenedioxy - 3 - ethylenedioxy-5-pregnane-11-one and 16α-methyl-6-ethynyl-17α,20,20,21 - bis - methylenedioxy - 3 - ethylenedioxy - 6-pregnene-11-one. Elution with ether gives an additional quantity of 16α-methyl-6-ethynyl-17α,20,20,21-bis-methylenedioxy-3-ethylenedioxy-5-pregnene-11-one.

Example 14

A solution of 3.70 g. of 16α-methyl-6-ethynyl-17α,20, 20,21 - bis - methylenedioxy - 3 - ethylenedioxy - 5 - pregnene-11-one in 125 cc. of ethyl acetate is hydrogenated at atmospheric pressure and 23° C., using 3.15 g. of Lindlar catalyst, which is added in 3 separate 1.05 g. portions: (1) at the beginning of the hydrogenation, (2) after about 20 minutes, and (3) after about 40 minutes, after first filtering off the spent catalyst. A total of about 177 cc. of hydrogen is absorbed, the calculated amount being 184 cc. The solution is filtered and concentrated to give the 16α - methyl - 6 - vinyl - 17α,20,20,21 - bis - methylenedioxy-3-ethylenedioxy-5-pregnene-11-one. The crude material may be used directly in the next step, or it may be purified by chromatography on alumina followed by recrystallization.

Example 15

A solution consisting of 3.8 g. of the crude 16α-methyl-6 - vinyl - 17α,20,20,21 - bis - methylenedioxy - 3 - ethylenedioxy-5-pregnene-11-one and 1.23 g. of OsO$_4$ (60% of the amount calculated for the pure steroid) in 100 cc. of benzene is allowed to stand at room temperature over night. The black osmate is transferred to a flask containing 150 cc. each of water and methanol, and 15 g. each of potassium bicarbonate and sodium sulfite. The benzene is removed by distillation, 200 cc. of methanol is added, and reflux is continued for a total of 4.5 hours. The solution is filtered and extracted with chloroform. The chloroform layer is washed with water, dried and concentrated in vacuo to give the 16α-methyl-6-([1,2]-ethanediol) - 17α,20,20,21 - bis - methylenedioxy - 3 - ethylenedioxy-5-pregnene-6β-ol-11-one. The unpurified material may be used directly in the next step, or it may be purified by chromatography on alumina followed by recrystallization.

Example 16

The 16α-methyl-6-([1,2]-ethanediol)-17α,20,20,21-bis-methylenedioxy-3-ethylenedioxy-5 - pregnene - 11 - one is cleaved by reaction of 3.9 of the crude diol with 3.8 g. of periodic acid in a solution consisting of 90 cc. methanol, 90 cc. pyridine and 9 cc. of water. The solution is maintained at room temperature for 45 minutes (there is an initial temperature rise) and poured into aqueous sodium bicarbonate. The mixture is extracted with chloroform and the chloroform layer is washed with water, dried and concentrated. Trituration with ether affords a crude crystalline material which on recrystallization from ethyl acetate affords the 16α-methyl-6-formyl-17α,20,20,21-bis-methylenedioxy-3-ethylenedioxy-5-pregnene-11-one.

Example 17

A solution of 0.94 g. of 16α-methyl-6-formyl-17α,20, 20,21-bis-methylenedioxy-3 - ethylenedioxy - 5 - pregnene-11-one in 50 cc. of tetrahydrofuran is treated with a solution of 1.0 g. sodium borohydride in 10 cc. of water. The two-phase system is stirred into 6.0 g. of sodium dihydrogen phosphate in 100 cc. of water. The suspension is extracted with chloroform and the organic phase is washed with water, dried and concentrated in vacuo. Crystallization from benzene affords 16α-methyl-6-hydroxymethyl-17α,20,20,21 - bis - methylenedioxy - 3 - ethylenedioxy-5-pregnene-11β-ol.

A solution of 135 mg. of 16α-methyl-17α,20,20,21-bis-methylenedioxy-3-ethylenedioxy-5-pregnene-11β-ol and 15 mg. of p-toluenesulfonic acid in 15 cc. of acetone is allowed to stand at room temperature overnight. The solution is poured into ice water and extracted with chloroform. The chloroform solution is washed with aqueous sodium bicarbonate, dried and concentrated. Crystallization from ethyl acetate gives 16α-methyl-6-exo-methylene-17α,20,20,21-bis-methylenedioxy-4-pregnene-11β-ol-3-one.

Example 18

A suspension of 550 mg. of 16α-methyl-6-formyl-17α,20,20,21-bis-methylenedioxy-3-ethylenedioxy-5-pregnene-11-one, and 550 mg. of sodium borohydride in 27 ml. of tetrahydrofuran and 5.4 ml. of water is stirred for 50 minutes at room temperature. The reaction mixture is poured into ice water containing 6 g. of sodium dihydrogen phosphate, extracted with chloroform, dried and concentrated. Two crystallizations from ethyl acetate afford a sample for analysis of 16α-methyl-6-hydroxymethyl-17α,20,20,21-bis-methylenedioxy-3-ethylenedioxy-5-pregnene-11-one.

A solution of 125 mg. of 16α-methyl-6-hydroxymethyl-17α,20,20,21-bis-methylenedioxy-3-ethylenedioxy-5-pregnene-11-one, and 15 mg. p-toluenesulfonic acid is allowed to stand at room temperature overnight. The reaction mixture is poured into aqueous sodium bicarbonate solution, extracted with chloroform, dried and concentrated. Two crystallizations from ethyl acetate-ether afford a sample of 16α-methyl-6-exomethylene-17α,20,20,21-bis-methylenedioxy-4-pregnene-3,11-dione.

Example 19

A suspension of 0.26 g. of 16α-methyl-6-exomethylene-17α,20,20,21-bis-methylenedioxy-4-pregnene-11β-ol-3-one in 8 cc. of 60% aqueous formic acid is heated on the steam bath for 20 minutes. The resulting solution is cooled, poured into ice water and extracted with chloroform. The organic phase is washed with aqueous sodium bicarbonate, dried and concentrated in vacuo. Crystallization from ethyl acetate affords 16α-methyl-6-exomethylene-4-pregnene-11β,17α,21-triol-3,20-dione.

To 175 mg. of the non-crystalline material is added 2 ml. of methanol and 0.10 ml. of 1 N sodium methoxide. The mixture is allowed to stand at room temperature for 15 minutes under an atmosphere of nitrogen in order to cleave any formate esters. After the addition of 2 drops of acetic acid, the material is poured into water and extracted with chloroform. The chloroform phase is washed with water, dried and concentrated in vacuo. The resulting gum is acetylated with 2.1 cc. of pyridine and 2.0 cc. acetic anhydride at room temperature overnight. The solution is poured into ice water and extracted with chloroform. The chloroform phase is dried and concentrated in vacuo. Chromatography on 10 g. of acid-washed alumina, elution with mixtures of chloroform and ether and crystallization from ethyl acetate gives 16α-methyl-6-exomethylene-4-pregnene-11β,17α,21-triol-3,20-dione acetate.

The 16α-methyl-6-exomethylene-4-pregnene-17α,21-diol-3,11,20-trione and the corresponding 21-acetate are prepared from the 16α-methyl-6-exomethylene-17α,20,20,21-bis-methylenedioxy-4-pregnene-3,11-dione following the above procedures, but starting with the 16α-methyl-6-exomethylene-17α,20,20,21-bis-methylenedioxy-4-pregnene-3,11-dione in place of the 16α-methyl-6-exomethylene-17α,20,20,21-bis-methylenedioxy-4-pregnene-11β-ol-3-one.

Example 20

To 100 mg. of 16α-methyl-6-exomethylene-4-pregnene-11β,17α,21-triol-3,20-dione 21-acetate in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 16α-methyl-6-exomethylene-1,4-pregnadiene-11β,17α,21-triol-3,20-dione-21-acetate.

The 16α-methyl-6-exomethylene-1,4-pregnadiene-17α,21-diol-3,11,20-trione-21-acetate is prepared from the 16α-methyl-6-exomethylene-4-pregnene-17α,21-diol-3,11,20-trione 21-acetate following the above procedure, but starting with the 16α-methyl-6-exomethylene-4-pregnene-17α,21-diol-3,11,20-trione 21-acetate in place of the 16α-methyl-6-exomethylene-4-pregnene-11β,17α,21-triol-3,20-dione-21-acetate.

Example 21

*Septomyxa affinis* (ATCC 6737) is inoculated from a slant into one or more 250 ml. shake flasks containing 50 ml. of the following medium: 2% Edamin (Sheffield Farms), 5% glucose, and 0.5% corn steep liquor. After a 48 hour incubation at 28° C., 10 mg. of 16α-methyl-6-exomethylene-4-pregnene-11β,17α,21-triol-3,20-dione is added to each shake flask as a dimethylformamide solution (100 mg./ml.). After a conversion period of 24 hours, the cells are removed by filtration, followed by three successive extractions with equal volumes of ethyl acetate. The extracts are combined and concentrated in vacuo.

The 16α-methyl-6-exomethylene-1,4-pregnadiene-11β,17α,21-triol-3,20-dione is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

*Bacillus sphaericus* (ATCC 12488) is inoculated from a slant into one or more 250 ml. shake flasks containing 50 ml. of the following medium: 2% Edamin (Sheffield Farms), 5% glucose, and 0.5% corn steep liquor. After a 24 hour incubation at 28° C., 10 mg. of 6-exomethylene-16α-methyl-4-pregnene-11β,17α,21-triol-3,20-dione is added to each shake flask as a dimethylformamide solution (100 mg./ml.). After a conversion period of 24 hours, the cells are removed by filtration, followed by three successive extractions with equal volume of ethyl acetate. The extracts are combined and concentrated in vacuo.

The 6-exomethylene-16α-methyl-1,4-pregnadiene-11β,17α,21-triol-3,20-dione is readily crystallized from the concentrate. Descending paper chromatography of the product in a system using formamide as the stationary phase and chloroform as the mobile phase, shows some of the steroid substrate, but is largely the somewhat more polar Δ'-dehydrogenation product.

The 16α-methyl-6-exomethylene-1,4-pregnadiene-17α,21-diol-3,11,20-trione is prepared from the 16α-methyl-6-exomethylene-4-pregnene-17α,21-diol-3,11,20-trione following the above procedures, but starting with the 16α-methyl-6-exomethylene-4-pregnene-17α,21-diol-3,11,20-trione in place of the 16α-methyl-6-exomethylene-4-pregnene-11β,17α,21-triol-3,20-dione.

*Corynebacterium simplex* (ATCC 6946) is inoculated from a slant to one or more 250 ml. shake flasks containing a medium having the composition: 1 g./liter yeast extract (Difco). After an 18 hour growth phase at 28° C., 10 mg. of 6-exomethylene-16α-methyl-4-pregnene-11β,17α,21-triol-3,20-dione-21-acetate is added to each shake flask as a dimethylformamide solution (100 mg./ml.). After a 24 hour transformation period at 28° C., the cells are centrifuged, followed by three ethyl acetate extracts of the cell-free broth. The extracts are combined and concentrated in vacuo. The 6-exomethylene-16α-methyl-1,4-pregnadiene-11β,17α,21-triol-3,20-dione-21-acetate is crystallized directly from the concentrate. Paper chromatography of the product in a system utilizing formamide as the stationary phase and chloroform-benzene (1:1)

as the mobile phase indicates that the product possesses a polarity slightly greater than the substrate.

The 16α - methyl-6-exomethylene-1,4-pregnadiene-17α,21-diol-3,11,20-trione-21-acetate is prepared from the 16α-methyl - 6-exomethylene-4-pregnene-17α,21-diol-3,11,20-trione-21-acetate following the above procedure, but starting with the 16α-methyl-6-exomethylene-4-pregnene-17α,21-diol-3,11,20-trione-21-acetate, in place of the 16α-methyl - 6 - exomethylene-4-pregnene-11β,17α,21-triol-3,20-dione-21-acetate.

Various changes and modifications may be made in carrying out the present invention without departing from the spirit and scope thereof. Insofar as these changes and modifications are within the purview of the annexed claims, they are to be considered as part of our invention.

We claim:

1. Process for the preparation of 6α-ethynyl-17α,20,20,21 - bis-methylenedioxy-3-ethylenedioxy-5α-pregnane-6β-ol-11-one which comprises reacting 17α,20,20,21-bis-methylene - dioxy - 3-ethylenedioxy-5α-pregnane-6,11-dione with acetylene magnesium halide.

2. Process for the preparation of 6-ethynyl-17α,20,20,21 - bis-methylenedioxy - 3-ethylenedioxy-5-pregnene-11-one which comprises dehydrating 6α-ethynyl-17α,20,20,21 - bis-methylenedioxy-3-ethylenedioxy-5α-pregnane-6β-ol-11-one with thionyl chloride.

3. Process for the preparation of 6-vinyl-17α,20,20,21 - bis-methylenedioxy-3-ethylenedioxy-5-pregnene-11-one which comprises hydrogenating 6-ethynyl-17α,20,20,21 - bis-methylene-dioxy-3-ethylenedioxy-5-pregnene-11-one using a Lindlar catalyst.

4. Process for the preparation of 6-([1,2]-ethanediol)-17α,20,20,21 - bis - methylenedioxy-3-ethylenedioxy-5-pregnene-11-one which comprises oxidizing 6-vinyl-17α,20,20,21 - bis - methylenedioxy-3-ethylenedioxy-5-pregnene-11-one with osmium tetroxide.

5. Process for the preparation of 6-formyl-17α,20,20,21 - bis-methylenedioxy - 3-ethylenedioxy-5-pregnene-11-one which comprises reacting 6-([1,2]-ethanediol)-17α,20,20,21 - bis - methylenedioxy-3-ethylenedioxy-5-pregnene-11-one with periodic acid.

6. Process for the preparation of 6-hydroxymethyl-17α,20,20,21 - bis-methylenedioxy-3-ethylenedioxy-5-pregnene-11β-ol which comprises reacting 6-formyl-17α,20,20,21-bis - methylenedioxy-3-ethylenedioxy-5-pregnene-11-one with sodium borohydride for about 60 hours at room temperature.

7. Process for the preparation of 6-exomethylene-4-pregnene-11β,17α,21-triol-3,20-dione which comprises reacting 6 - exomethylene-17α,20,20,21-bis-methylenedioxy-4-pregnene-11β-ol-3-one with a lower carboxylic acid.

8. 6α - ethynyl - 17α,20,20,21-bis-methylenedioxy-3-ethylenedioxy-5α-pregnane-6β-ol-11-one.

9. 6 - ethynyl - 17α,20,20,21 - bis-methylenedioxy-3-ethylenedioxy-5-pregnene-11-one.

10. 6 - ethynyl - 17α,20,20,21-bis-methylenedioxy-3-ethylenedioxy-6-pregnene-11-one.

11. 6 - formyl - 17α,20,20,21 - bis-methylenedioxy-3-ethylenedioxy-5-pregnene-11-one.

12. 6 - hydroxymethyl - 17α,20,20,21 - bis-methylenedioxy-3-ethylenedioxy-5-pregnene-11β-ol.

13. 6 - exomethylene - 17α,20,20,21-bis-methylenedioxy-4-pregnene-11β-ol-3-one.

14. A compound selected from the group consisting of 6 - exomethylene - 4 - pregnene-11β,17α,21-triol-3,20-dione and the 21-acetate thereof.

15. A compound selected from the group consisting of 6 - exomethylene - 1,4 - pregnadiene-11β,17α,21-triol-3,20-dione and the 21-acetate thereof.

16. 6 - hydroxymethyl - 17α,20,20,21-bis-methylenedioxy - 3 - ethylenedioxy - 5 - pregnene-11-one.

17. 6 - exomethylene - 17α,20,20,21-bis-methylenedioxy-4-pregnene-3,11-dione.

18. 16α - methyl - 6α-ethynyl-17α,20,20,21-bis-methylenedioxy-3-ethylenedioxy-5α-pregnane-6β-ol-11-one.

19. 16α - methyl - 6-ethynyl-17α,20,20,21-bis-methylenedioxy-3-ethylenedioxy-5-pregnene-11-one.

20. 16α - methyl - 6 - ethynyl-17α,20,20,21-bis-methylenedioxy-3-ethylenedioxy-6-pregnene-11-one.

21. 16α - methyl - 6 - vinyl-17α,20,20,21-bis-methylenedioxy-3-ethylenedioxy-5-pregnene-11-one.

22. 16α - methyl - 6 - formyl-17α,20,20,21-bis-methylenedioxy-3-ethylenedioxy-5-pregnene-11-one.

23. 16α - methyl - 6 - formyl-17α,20,20,21-bis-methylenedioxy-3-ethylenedioxy-6-pregnene-11-one.

24. 16α - methyl - 6 - hydroxymethyl-17α,20,20,21-bis-methylenedioxy-3-ethylenedioxy-5-pregnene-11β-ol.

25. 16α - methyl - 6 - exomethylene-17α,20,20,21-bis-methylenedioxy-4-pregnene-11β-ol-3-one.

26. A compound selected from the group consisting of 16α - methyl-6-exomethylene-4-pregnene-11β,17α,21-triol-3,20-dione and the 21-acetate thereof.

27. A compound selected from the group consisting of 16α - methyl - 6 - exomethylene - 1,4-pregnadiene-11β,17α,21-triol-3,20-dione and the 21-acetate thereof.

28. 16α - methyl - 6 - hydroxymethyl - 17α,20,20,21-bis-methylenedioxy - 3 - ethylenedioxy - 5 - pregnene-11-one.

29. 16α - methyl - 6 - exomethylene-17α,20,20,21-bis-methylenedioxy-4-pregnene-3,11-dione.

30. A compound selected from the group consisting of 16α - methyl-6-exomethylene-1,4-pregnadiene-17α,21-diol-3,11,20-trione and the 21-acetate thereof.

References Cited in the file of this patent
UNITED STATES PATENTS 2,837,464    Nobile ------------------ June 3, 1958
2,980,711    Colton ------------------ Apr. 18, 1961